United States Patent
Abe et al.

(10) Patent No.: US 8,008,989 B2
(45) Date of Patent: Aug. 30, 2011

(54) POWER LINE COMMUNICATION SYSTEM AND CAPACITIVE SIGNAL COUPLING UNIT

(75) Inventors: Junichi Abe, Tokyo (JP); Yuichiro Murata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 550 days.

(21) Appl. No.: 11/944,025

(22) Filed: Nov. 21, 2007

(65) Prior Publication Data
US 2008/0303609 A1   Dec. 11, 2008

(30) Foreign Application Priority Data
Jun. 8, 2007 (JP) ................. 2007-152727

(51) Int. Cl.
*H01P 5/12* (2006.01)
(52) U.S. Cl. ................... 333/124; 340/310.17
(58) Field of Classification Search .......... 333/310.13, 333/310.15, 310.16, 310.17, 538.12, 538.14, 333/538.15, 538.16, 100, 124–129; 340/310.13, 340/310.15, 310.16, 310.17, 538.12, 538.14, 340/538.15, 538.16
See application file for complete search history.

(56) References Cited

U.S. PATENT DOCUMENTS
6,014,386 A * 1/2000 Abraham ............... 370/485
7,307,512 B2 * 12/2007 Yaney et al. ............ 340/310.18

FOREIGN PATENT DOCUMENTS
JP     2004-336456    11/2004

* cited by examiner

*Primary Examiner* — Robert Pascal
*Assistant Examiner* — Kimberly E Glenn
(74) *Attorney, Agent, or Firm* — Oblon, Spivak, McClelland, Maier & Neustadt, L.L.P.

(57) ABSTRACT

In power line communications using carrier waves of high frequencies in the MHz range such as 2 to 30 MHz, when a coaxial cable for performing transmission of signals and a power line are signal-coupled using a capacitive signal coupling unit, even if an impedance matching circuit is installed in the capacitive signal coupling unit, we have found that leakage current of levels that cannot be neglected from leakage noise considerations flows through the outer sheath of the coaxial cable that transmits the signals, and, accordingly, leaking electromagnetic waves induced by the leakage current flowing through the coaxial cable due to impedance mismatch between the power line and the capacitive signal coupling unit are reduced by an impedance member showing high impedances at high frequencies in the MHz range.

14 Claims, 7 Drawing Sheets

FIG. 6 ns are performed using carrier waves of high frequencies in the MHz range. To reduce leakage current flowing through the coaxial cable due to impedance mismatch between the power line and the capacitive signal coupling unit, the coaxial cable for performing transmission of signals and the power line are signal-coupled using the capacitive signal coupling unit. Power line communications are performed using carrier waves of high frequencies in the MHz range. Leakage currents which would have been heretofore considered not to flow through the outer sheath of the coaxial cable but which do flow through it in practice can be suppressed. There is the advantage that electromagnetic waves leaking from the outer sheath of the coaxial cable can be reduced.

POWER LINE COMMUNICATION SYSTEM AND CAPACITIVE SIGNAL COUPLING UNIT

BACKGROUND OF THE INVENTION

1. Field of the Invention

The present invention relates to a power line communication (PLC) system for performing communications using power lines and to a capacitive signal coupling unit (also known as a capacitive signal coupler) used in such a PLC communication system.

2. Description of the Related Art

Power line communications are communication techniques in which signals are superimposed on power lines such that the signals are sent and received via the power lines. In recent years, carrier waves of high frequencies have tended to be used to carry signals in PLC rather than carrier waves of low frequencies, and high-speed, high-capacity communications have been accomplished. Therefore, a technique combining two modes of signal transmission is under discussion. In particular, signals are transferred to electric power substations or power delivery transformers by optical cables or other communication technique. The signals are then transferred to individual homes by communications making use of power lines included in overhead lines or underground lines.

In order to superimpose a signal onto a power line, it is necessary to electrically connect the power line and a communication device. Because the power line is supplied with electric power, it is impossible to directly connect the communication device with the power line of a voltage, for example, of the order of kV to tens of kV. Therefore, a signal coupler for injecting a signal to the power line or extracting a signal from the power line is mounted to the power line. The communication device is connected with the signal coupler. Consequently, communications between communication devices are enabled via the power line.

Intrinsically, a power line is not designed to transmit high-frequency signals. Therefore, where a high-frequency signal is transmitted through the power line, electromagnetic waves leaking from the power line present problems. In one known technique (for example, see the following patent reference 1), a clamped coil is inserted into the grounded line to enhance the degree of balance of the power line. The coil reduces the common current flowing through the power line, thus decreasing the leakage of electromagnetic waves.

Patent reference 1: JP-A-2004-336456 (page 3, lines 45-48 and FIG. 1)

It has become necessary to pay attention to electromagnetic waves leaking from the vicinity of a capacitive signal coupling unit in a desired frequency range, as well as to electromagnetic waves leaking from high-frequency signals transmitted through the power line, for the safety of the human body and because of noise problems with devices caused by electromagnetic waves.

SUMMARY OF THE INVENTION

The present invention has been made to solve the foregoing problems. It is an object of the present invention to provide a power line communication system which performs power line communications using high-frequency carrier waves and which suppresses electromagnetic waves leaking from the vicinity of a capacitive signal coupling unit.

The present invention provides a power line communication system in which a coaxial cable for performing transmission of signals and a power line are signal-coupled using a capacitive signal coupling unit and in which power line commu The present invention also provides a capacitive signal coupling unit which is applied to a power line communication system for performing power line communications using carrier waves of high frequencies in the MHz range and which signal-couples a coaxial cable and a power line. The cable transmits signals. A first capacitor is connected to the power line side of the capacitive signal coupling unit. A second capacitor that is substantially identical in capacitance with the first capacitor is connected to the grounded line side. Therefore, where the capacitive signal coupling unit according to the invention is applied to a power line communication system for performing power line communications using carrier waves of high frequencies in the MHz range, good impedance matching can be achieved between the capacitive signal coupling unit and the power line. The leakage current flowing through the outer sheath of the coaxial cable decreases and so electromagnetic waves leaking from the outer sheath of the cable can be reduced.

The foregoing and other objects, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
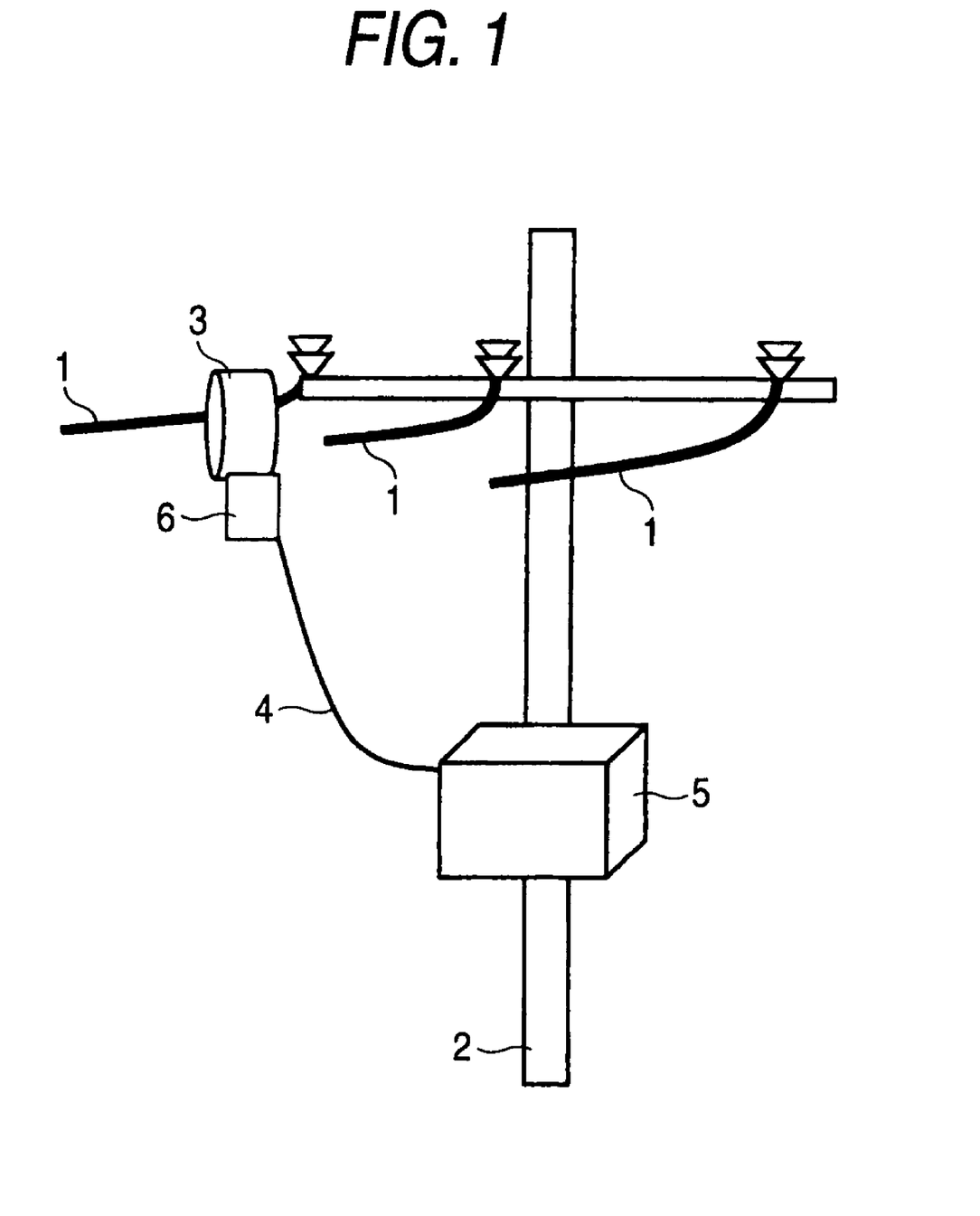
FIG. 1 is a perspective view of a power line communication system according to Embodiment 1 of the present invention for performing power line communications using a capacitive signal coupling unit which signal-couples a coaxial cable performing transmission of signals and a power line.
Figure 2:
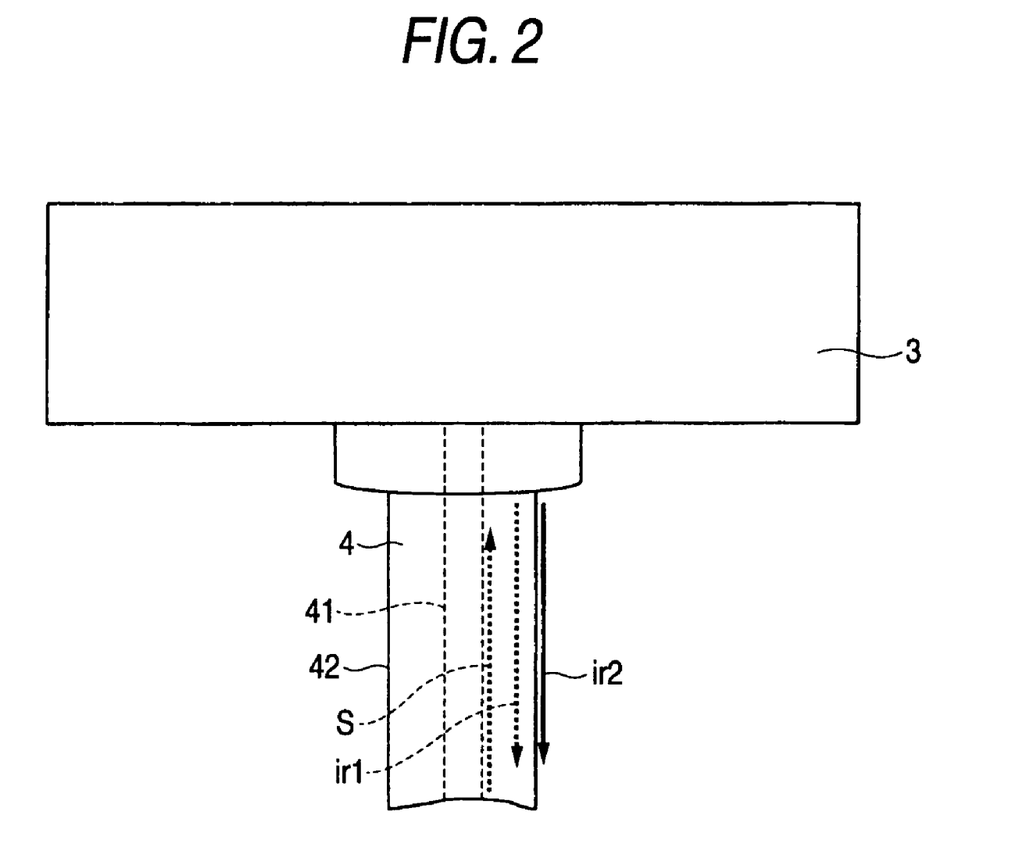
FIG. 2 is a side elevation of the capacitive signal coupling unit shown in FIG. 1, the coupler being included in the power line communication system according to Embodiment 1, and in which a signal return path in the coaxial cable connected with the coupler is shown.

Embodiment 1 of the present invention is described below by referring to FIGS. 1 and 2. FIG. 1 shows a power line communication system for performing power line communications using a capacitive signal coupling unit that signal-couples a coaxial cable for performing transmission of signals and a power line. In this system, the power line is a power distribution line. FIG. 2 shows the signal return path in the coaxial cable connected with the capacitive signal coupling unit.

Referring to FIG. 1, a signal sent from a communication device 5 mounted on a utility pole 2 for a power distribution line 1 is transmitted through a coaxial cable 4 and superimposed on the power distribution line 1 via a capacitive signal coupling unit 3.

Generally, the distribution line has a characteristic impedance of hundreds of Ω. Normally, the coaxial cable 4 has a characteristic impedance of 50 Ω. Therefore, the capacitive signal coupling unit 3 is equipped with a circuit for impedance matching.

However, it has been found that complete impedance matching is not achieved over a wide range of high frequencies from 2 to 30 MHz, for the following reason. As shown in FIG. 2, a returning signal ir1 flows through a signal path for a signal S, the path being in the grounded, internal conductor coating of the coaxial cable 4 as indicated by the dotted line. In addition, a returning signal ir2 flows as a leakage current through the outer conductor sheath 42 that covers the core (conductor) 41 of the coaxial cable 4 as indicated by the arrow of the solid line. As a result, the coaxial cable acts like an antenna and radiates electromagnetic waves.

In order to reduce the leakage current flowing through the outer sheath 42 of the coaxial cable, we mounted a high-impedance member 6 showing hundreds of Ω or more at 2 to 30 MHz to the outer sheath 42 of the coaxial cable near the junction between the capacitive signal coupling unit 3 and the cable 4. We have found that the impedance of the outer sheath 42 of the coaxial cable can be enhanced and the leakage current flowing through the outer sheath 42 can be reduced. As a result, leaking electromagnetic waves can be reduced.

In this case, the impedance of the high-impedance member 6 is the impedance of one turn of coil wound around a dough-nut-shaped core member.

The present Embodiment 1 has the following technical features. It is difficult to achieve complete impedance matching over some frequency range. Therefore, a leakage current is induced in the outer sheath of the coaxial cable due to impedance mismatching. The leakage current is suppressed by adding a high-impedance element. Consequently, generation of electromagnetic waves leaking near the capacitive signal coupling unit is suppressed. The magnitude of the leakage current varies depending on whether or not there is the impedance matching circuit. In any case, impedance mismatching takes place. Therefore, it is necessary to suppress the leakage current (hence the leaking electromagnetic waves).

Normally, the high-impedance element adds an inductance to the outer sheath. In particular, the coaxial cable is surrounded by a magnetic material. Especially, use of a magnetic material having a high magnetic permeability (e.g., hundreds to thousands) especially at high frequencies in the MHz range is preferable. Desirable examples of the material include ferrites, amorphous materials, Permalloy, and nanocrystalline materials which show high impedances, for example, of several hundreds of Ω or more at 2 to 30 MHz.

The impedance member 6 is mounted to the outer sheath 42 near the joint between the capacitive signal coupling unit 3 and the coaxial cable 4 such that the load of the impedance member 6 is sustained. In addition, the impedance member 6 may be mounted to other than the outer sheath 42 of the coaxial cable 4, for example, to the capacitive signal coupling unit 3.

Further specific examples of the present invention are hereinafter described as Embodiments 2-4.

Embodiment 2

Figure 3:
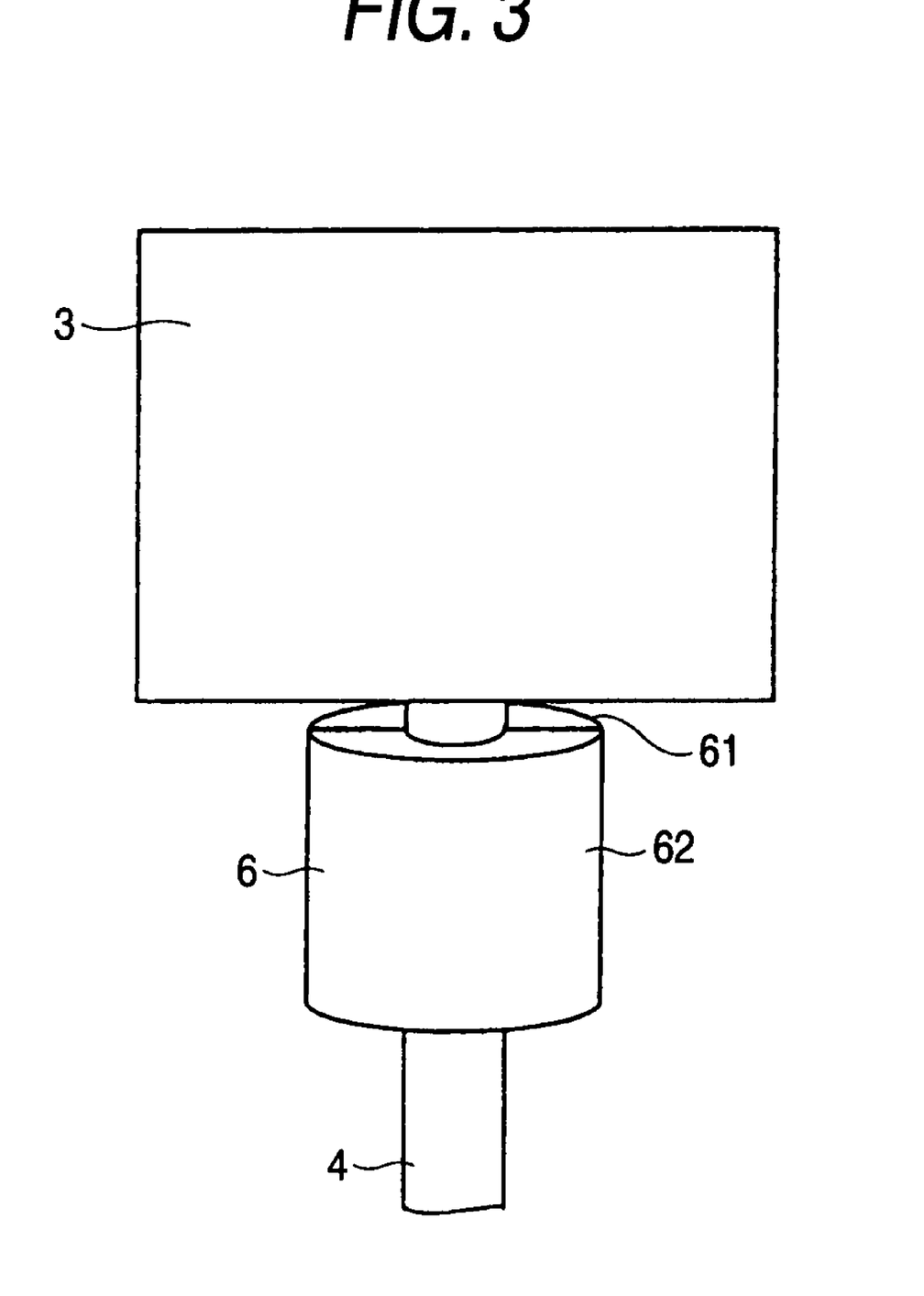
FIG. 3 is a side elevation of a power line communication system according to Embodiment 2 of the present invention, the system performing power line communications using a capacitive signal coupling unit for signal-coupling a coaxial cable for performing transmission of signals and a power line.
Figure 4:
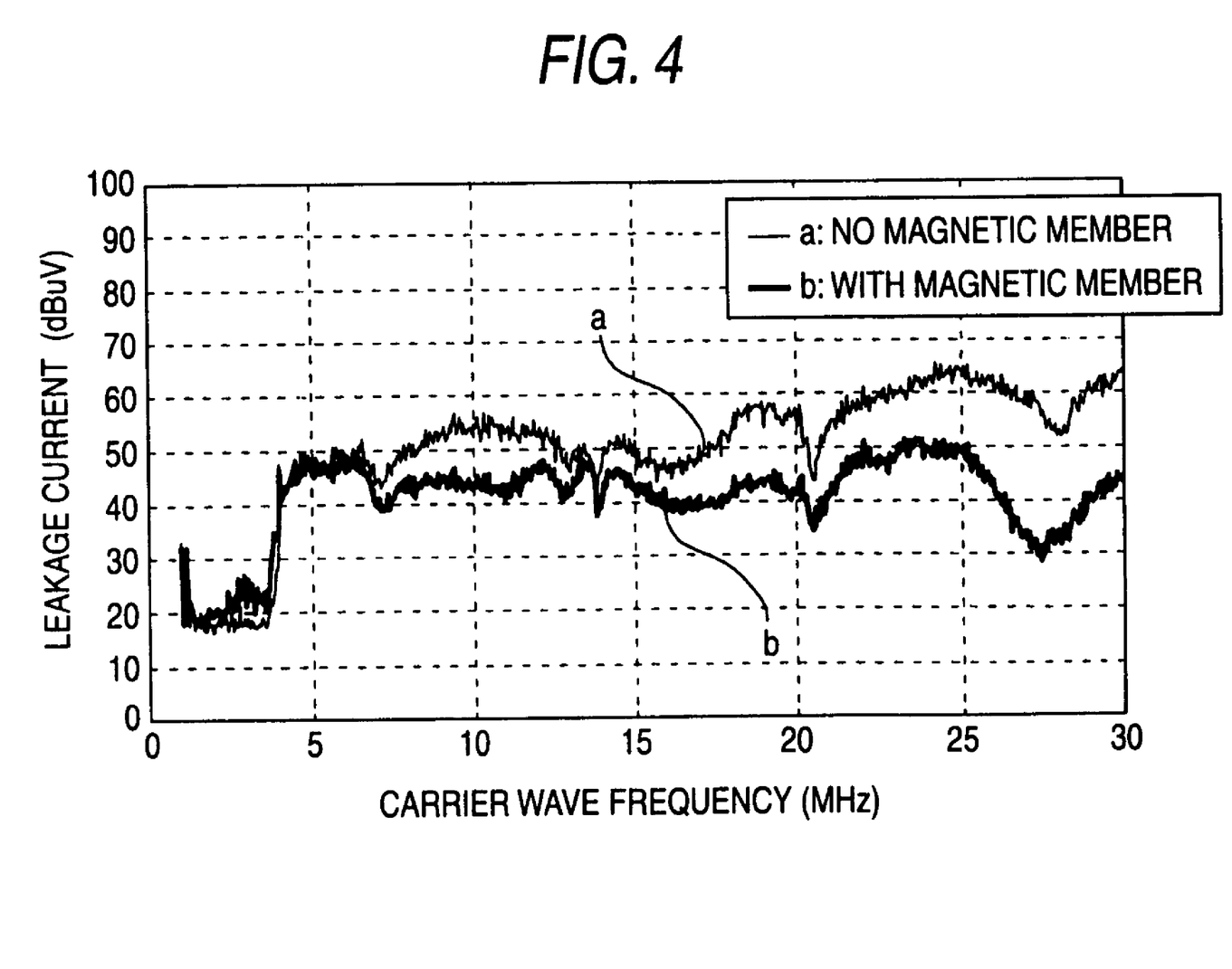
FIG. 4 is a graph showing the characteristics of the power line communication system which is shown in FIG. 3 and built according to Embodiment 2, illustrating the advantages of the communication system.

Embodiment 2 of the present invention is hereinafter described by referring to FIGS. 3 and 4. FIG. 3 is a side elevation of a power line communication system according to Embodiment 2, the system performing power line communications using a capacitive signal coupling unit for signal-coupling a coaxial cable for performing transmission of signals and a power line. FIG. 4 is a graph showing the characteristics of the power line communication system which is shown in FIG. 3, illustrating the advantages of the communication system.

In FIG. 3, a clamped impedance member 6 made of a magnetic material and having an impedance of hundreds of Ω or more at 2 to 30 MHz is mounted near the junction between the capacitive signal coupling unit 3 and the coaxial cable 4.

As shown in FIG. 3, plural magnetic material parts 61 and 62, each having a semicircular cross section, are clamped together around the coaxial cable 4 to form a cylindrical impedance member 6. That is, this impedance member 6 can be easily mounted to the coaxial cable 4. The plural magnetic material parts 61 and 62 can be bonded together or clamped together by a well-known technique. For example, the magnetic material parts 61 and 62 are combined to form a cylindrical magnetic core. Then, the core is tightened with a flexible tightening band (not shown). In another example, the magnetic material parts 61 and 62 are combined into a cylindrical form, and the parts 61 and 62 are bonded together with a magnetic adhesive.

Examples of the magnetic material that can be used as the impedance member 6 include ferrite cores, amorphous materials, and nanocrystalline materials.

For example, the magnetic material parts 61 and 62 are combined into a cylindrical form to form a magnetic core. One turn of coil is wound around the core. The assembly has an inside diameter of a, an outside diameter of b, a height of h, a space permeability of $\mu_0$, and a relative permeability of $\mu_r$. The impedance z of the magnetic core at frequency f is given by $$Z = 2\pi f \mu_0 \mu_r \ln(b/a)$$

The results of the confirmed advantages of the present Embodiment 2 are shown in FIG. 4, where the vertical axis indicates the magnitude (dBuV) of a leakage current flowing through the outer sheath of the coaxial cable, while the horizontal axis indicates the frequency of the carrier wave (MHz). a indicates actually measured values of leakage current in a case where there is no magnetic member. b indicates actually measured values of leakage current in a case where there are magnetic members. As shown in the graph of FIG. 4, it has been demonstrated that the leakage current flowing through the outer sheath of the coaxial cable varies depending on whether or not there are the magnetic materials, or the impedance member 6.

As shown in FIG. 4, it can be seen that the leakage current flowing through the outer sheath varies only a little at relatively low frequencies of 1 to 3 MHz out of the high frequencies in the MHz range but decreases by about 10 to 20 dB at higher frequencies.

Embodiment 3

Figure 5:
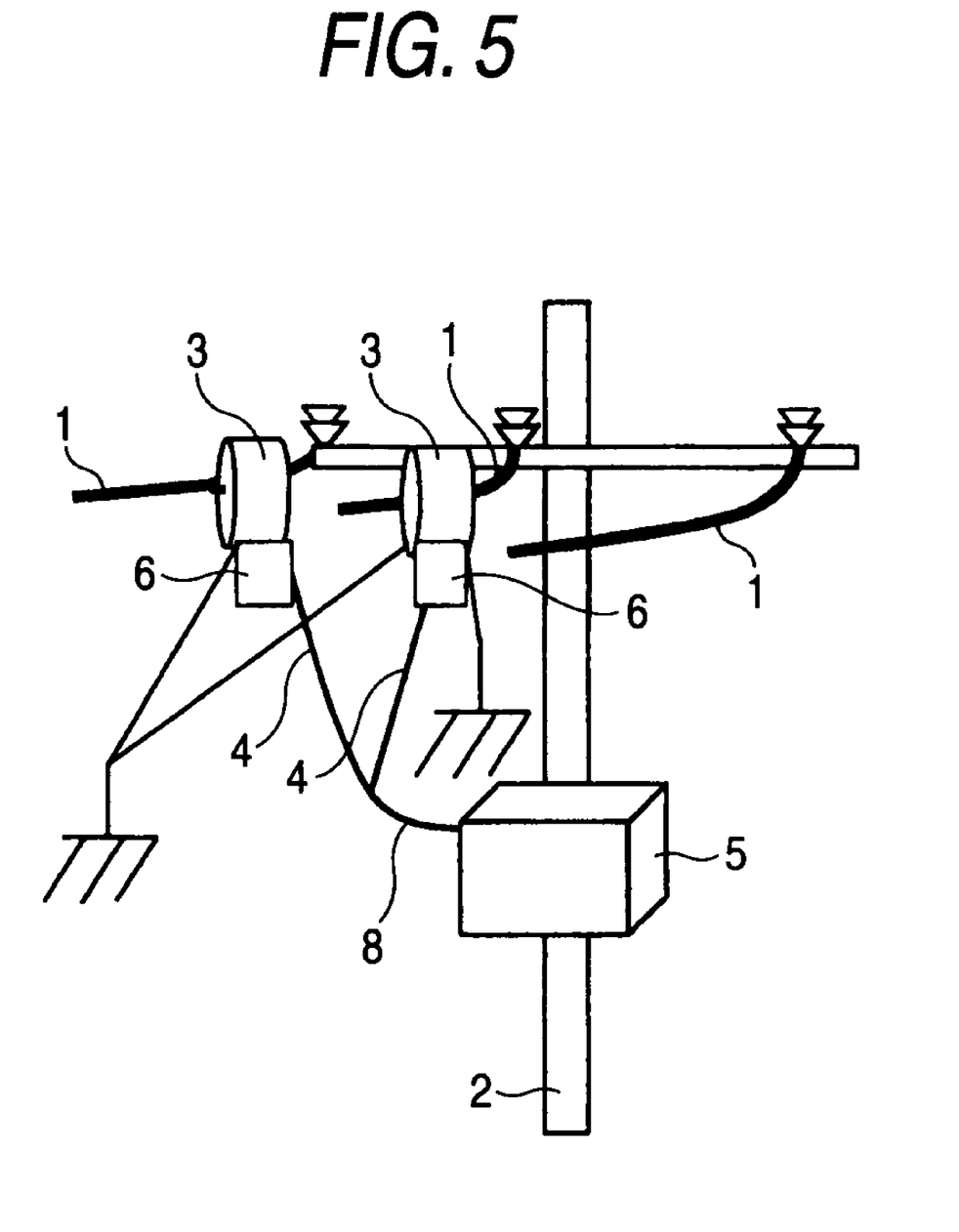
FIG. 5 is a perspective view of a further power line communication system according to Embodiment 3 of the present invention, the system performing power line communications using capacitive signal coupling units each of which signal-couples a coaxial cable for transmission of signals and a power line.

Embodiment 3 of the present invention is hereinafter described by referring to FIG. 5. FIG. 5 shows a further power line communication system for performing power line communications using capacitive signal coupling units each of which signal-couples a coaxial cable and a power line. The cable is used to transfer signals.

As shown in FIG. 5, the present Embodiment 3 gives an example in which signals are superimposed on power lines 1 at different phases in a differential manner using plural (typically, two) capacitive signal coupling units 3. The output signal from a communication device 5 is delivered via a differential cable 8 branching into parts to superimpose signals onto the power lines 1 at the different phases. Impedance members 6 which show high impedances at 2 to 30 MHz are mounted at the junctions of the capacitive signal coupling units 3 and their corresponding coaxial cables 4. Consequently, leakage currents can be reduced. Hence, leaking electromagnetic waves can be reduced.

In the structure of the present Embodiment 3, the impedance members 6 are disposed at the coaxial cables 4, respectively, connected with the plural capacitive signal coupling units 3 for superimposing signals onto the power lines 1 at the different phases.

Embodiment 4

Figure 6:
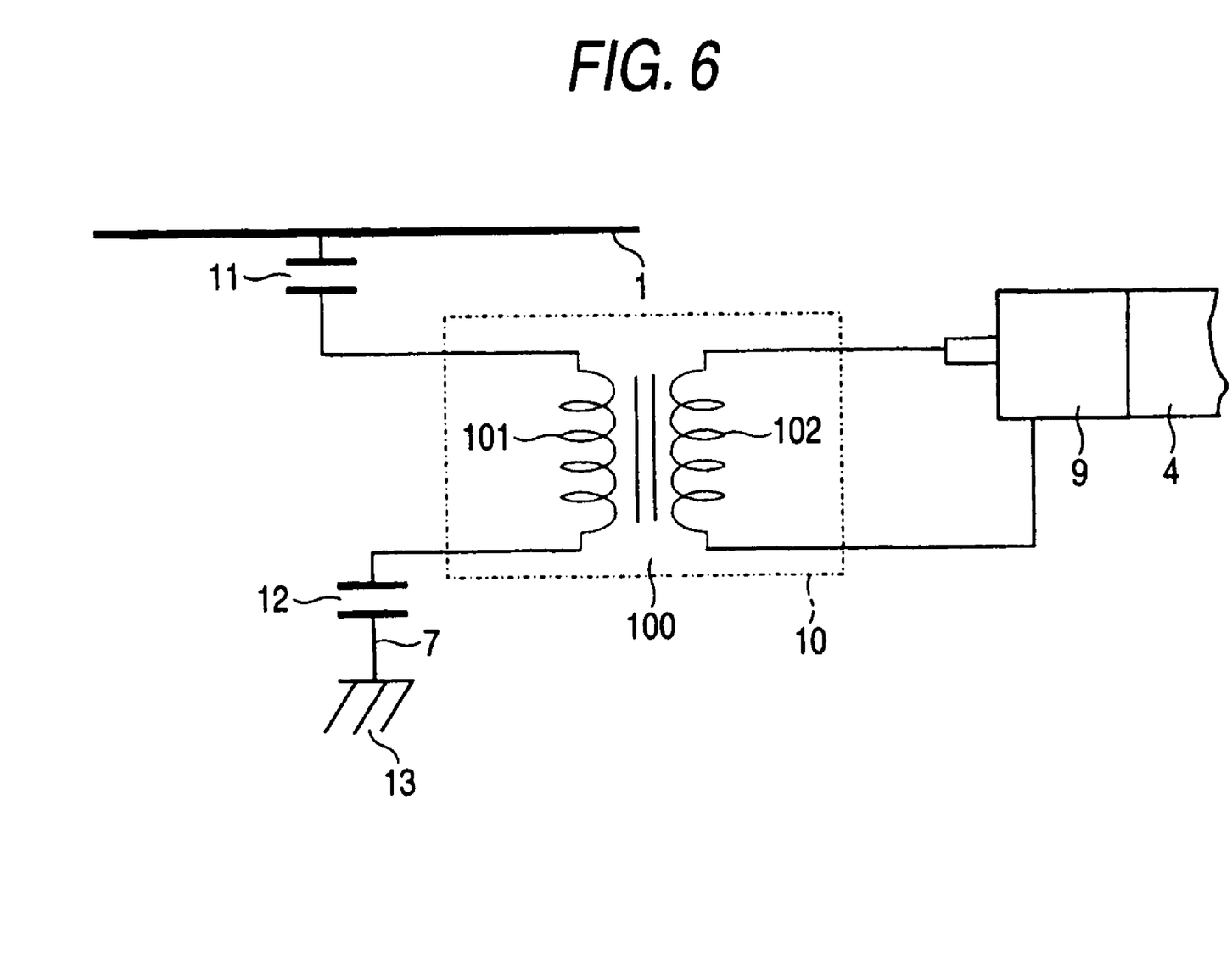
FIG. 6 is a circuit diagram of a still other power line communication system according to Embodiment 4 of the present invention, the system performing power line communications using a capacitive signal coupling unit for signal-coupling a coaxial cable for transmission of signals and a power line.
Figure 7:
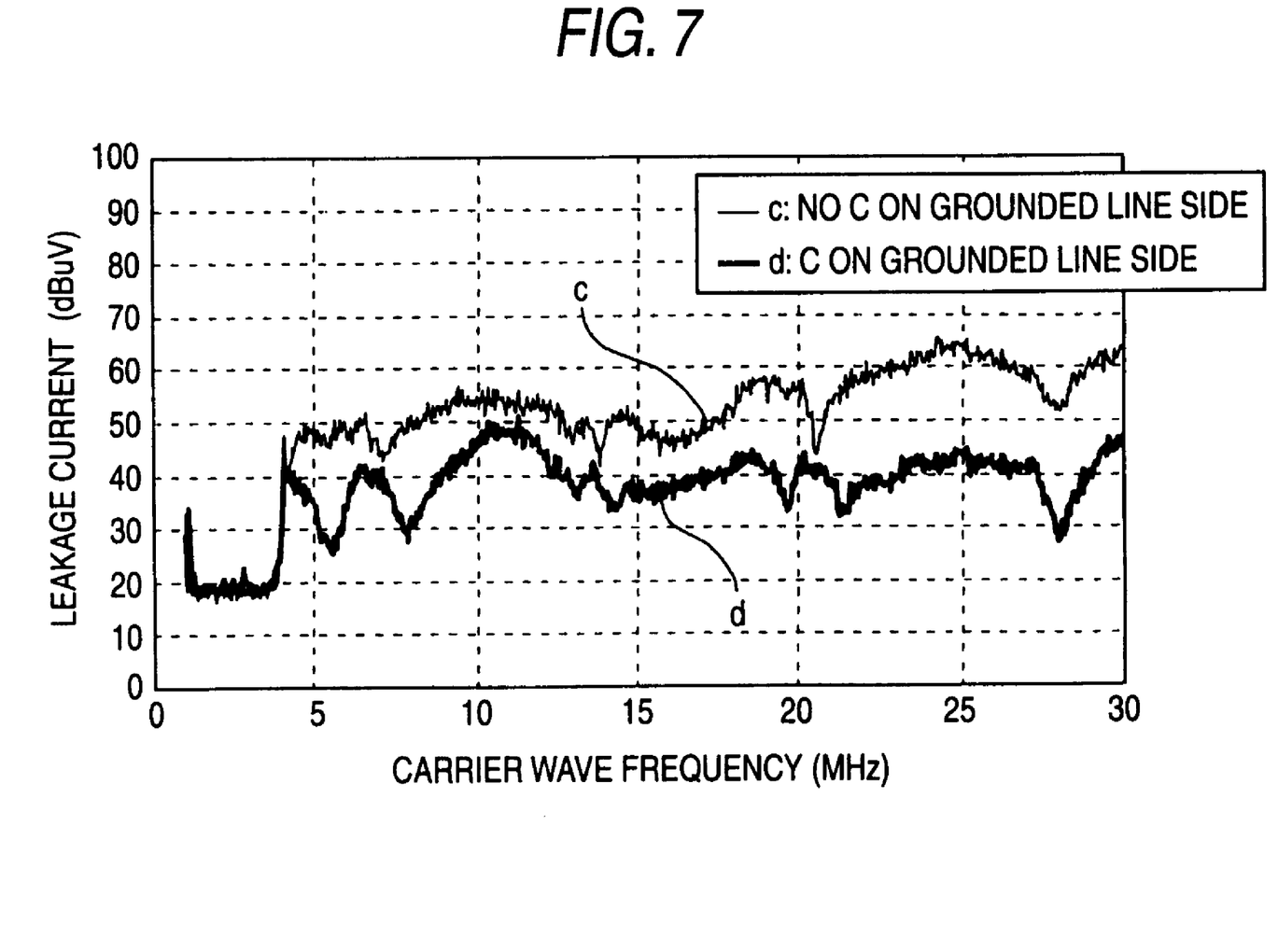
FIG. 7 is a graph showing the characteristics of the power line communication system which is shown in FIG. 6 and built according to Embodiment 4, illustrating the advantages of the communication system.

Embodiment 4 of the present invention is hereinafter described by referring to FIGS. 6 and 7. FIG. 6 is a circuit diagram of a power line communication system according to Embodiment 4, the system performing power line communications using a capacitive signal coupling unit for signal-coupling a coaxial cable for transmission of signals and a power line. FIG. 7 is a graph showing the characteristics of the power line communication system which is shown in FIG. 6, illustrating the advantages of the communication system.

FIG. 6 shows the circuit configuration of a capacitive signal coupling unit used for an overhead line for superimposing signals onto a power line using a capacitor. Signals pass through a connector 9 connected with a coaxial cable 4 extending from the communication device 5 (see FIGS. 1 and 5). The signals then pass through an impedance matching circuit 10 and are superimposed onto power lines 1 by first capacitors 11 (only one is shown), the capacitors 11 being for electric power lines.

In particular, the impedance matching circuit 10 has a transformer 100 including a primary coil 101 and a secondary coil 102. A first capacitor 11 is connected between one end of the primary coil 101 and a power line 1. A second capacitor 12 is connected between the other end of the primary coil 101 and ground 13. A coaxial cable 4 is connected with the secondary coil 102 via the connector 9.

The present Embodiment 4 provides a power line communication system for performing power line communications using carrier waves of high frequencies in the MHz range. The coaxial cable 4 for performing transmission of signals and the power line 1 are signal-coupled using the capacitive signal coupling unit 3. In this power line communication system, the second capacitor 12 that is substantially identical in capacitance with the first capacitor 11 is connected with the grounded line 7 side of the capacitive signal coupling unit 3. The first capacitor 11 is in the coupling unit 3 and on the side of the power line 1. More specifically, the first capacitor 11 is connected between one end of the primary coil 101 of the impedance matching circuit 10 and the power line 1. The second capacitor 12 is connected between the other end of the primary coil 101 of the impedance matching circuit 10 and the ground 13. The coaxial cable 4 is connected with the secondary coil 102 of the impedance matching circuit 10.

In the present Embodiment 4, the second capacitor 12 is connected between the grounded line 7 on the higher voltage side and the impedance matching circuit 10, the grounded line 7 being connected with the power line 1 via the impedance matching circuit 10. The second capacitor 12 is substantially identical in capacitance with the first capacitor 11 for power line. As a result, we have found that the degree of balance of the transmission line is enhanced. The leakage current flowing through the outer sheath of the coaxial cable 4 decreases. In this way, leaking electromagnetic waves can be reduced.

The results of actual measurements on Embodiment 4 are shown in FIG. 7 to demonstrate the advantages of Embodiment 4. In FIG. 7, the vertical axis indicates the magnitude of leakage current (dBuV) flowing through the outer sheath of the coaxial cable, whereas the horizontal axis indicates the frequency of the carrier waves (MHz). c indicates actually measured values of the leakage current in a case where the second capacitor 12 (indicated by C in FIG. 7) are not present on the grounded side. d indicates actually measured values of the leakage current in a case where the second capacitor is present on the grounded side. It has been demonstrated that the leakage current flowing through the outer sheath of the coaxial cable varies depending on whether or not the second capacitor 12 is connected with the grounded line 7 side, as shown in FIG. 7.

As can be seen from FIG. 7, the leakage current flowing through the outer sheath varies only a little at relatively low frequencies of 1 to 3 MHz out of the high frequencies in the MHz range but decreases by about 10 to 20 dB at higher frequencies.

In this way, the present Embodiment 4 provides the power line communication system in which a communicating signal is superimposed on the power line 1 using the capacitive signal coupling unit 3. A capacitor that is equal in capacitance with the capacitor used in the capacitive signal coupling unit 3 is inserted in the grounded line 7 side of the capacitive signal coupling unit 3. Consequently, impedance matching can be achieved between the capacitive signal coupling unit 3 and the power line 1. The amount of reflection decreases. The leakage current flowing through the outer sheath 42 of the coaxial cable 4 decreases. Hence, electromagnetic waves leaking from the outer sheath 42 of the coaxial cable 4 can be reduced. Furthermore, the degree of balance between the capacitive signal coupling unit 3 and the power line 1 is enhanced by inserting a capacitor between the grounded line 7 on the higher voltage side and the impedance matching circuit 10 and setting the capacitance of this inserted capacitor equal to the capacitance of the capacitor connected with the power line 1. Furthermore, impedance matching can be achieved. The characteristic impedance is determined by the impedance between the hot line (i.e., the power line 1) and the grounded line 7 and so impedance matching is not achieved when a capacitor is connected with only the active line and no capacitor is connected with the grounded line 7. Consequently, the leakage current flowing through the outer sheath 42 of the coaxial cable 4 decreases. Hence, electromagnetic waves leaking from the outer sheath 42 of the coaxial cable 4 can be reduced.

The impedance matching circuit 10 may be mounted in the capacitive signal coupling unit 3 itself.

The capacitive signal coupling unit 3 is applied to the power line communication system for performing power line communications using carrier waves of high frequencies in the MHz range and signal-couples the coaxial cable 4 for performing transmission of signals and the power line 1. The second capacitor 12 that is substantially identical in capacitance with the first capacitor 11 connected with the power line 1 side of the capacitive signal coupling unit 3 may be connected with the grounded line 7 side.

More specifically, the capacitive signal coupling unit may also be designed as follows. The first capacitor 11 is connected between one end of the primary coil 101 of the impedance matching circuit 10 and the power line 1. The second capacitor 12 is connected between the other end of the primary coil 101 of the impedance matching circuit 10 and the ground 13. The coaxial cable 4 is connected with the secondary coil 102 of the impedance matching circuit 10.

In FIGS. 1-7, the same symbols indicate identical or corresponding parts.

Various modifications and alterations of this invention will be apparent to those skilled in the art without departing from the scope and spirit of this invention, and it should be understood that this is not limited to the illustrative embodiments set forth herein.

What is claimed is:

1. A power line communication system for performing power line communications using carrier waves of high frequencies in the MHz range, the power line communication system comprising:
    at least one coaxial cable for performing transmission of signals;
    at least one power line;
    at least one capacitive signal coupling unit for signal-coupling the at least one coaxial cable and the at least one power line, the at least one capacitive signal coupling unit including an impedance matching circuit; and
    at least one impedance member to reduce leakage current flowing through the at least one coaxial cable due to impedance mismatching between the at least one power line and the at least one capacitive signal coupling unit, the at least one impedance member showing an impedance of at least hundreds of ohms in the MHz range, the at least one impedance member being separate from the impedance matching circuit.

2. A power line communication system according to claim 1, wherein the at least one impedance member is mounted on or in an outer sheath of the at least one coaxial cable near a location where the at least one coaxial cable is connected with the at least one capacitive signal coupling unit.

3. A power line communication system according to claim 1, wherein the at least one impedance member is a magnetic member showing high magnetic permeabilities at high frequencies in the MHz range.

4. A power line communication system according to claim 3, wherein the magnetic member is made of a material selected from a ferrite, and an amorphous material.

5. A power line communication system according to claim 1, wherein the at least one impedance member is clampingly held to an outer sheath of the at least one coaxial cable.

6. A power line communication system according to claim 4, wherein the at least one impedance member is clampingly held to an outer sheath of the at least one coaxial cable.

7. A power line communication system according to claim 6, wherein;
    the at least one capacitive signal coupling unit is plural in number,
    the at least one power line is plural in number,
    the at least one impedance member is plural in number,
    the at least one coaxial cable is plural in number, and
    the at least one member is disposed on respective ones of the coaxial cables connected with respective ones of the capacitive signal coupling units for superimposing signals on the power lines at different phases.

8. A power line communication system according to claim 1, wherein;
    the at least one capacitive signal coupling unit is plural in number,
    the at least one power line is plural in number,
    the at least one impedance member is plural in number,
    the at least one coaxial cable is plural in number, and
    the at least one impedance member is disposed on respective ones of the coaxial cables connected with respective ones of the capacitive signal coupling units for superimposing signals on the power lines at different phases.

9. A power line communication system for performing power line communications using carrier waves of high frequencies in the MHz range, the power line communication system comprising:
    at least one coaxial cable for performing transmission of signals;
    at least one power line;
    at least one capacitive signal coupling unit for signal-coupling the at least one coaxial cable and the at least one power line; and
    leakage current reducing means;
    wherein the leakage current reducing means reduces leakage current flowing through the at least one coaxial cable due to impedance mismatching between the at least one power line and the at least one capacitive signal coupling unit,
    wherein the at least one capacitive signal coupling unit comprises a first capacitor which is connected near the at least one power line, and
    wherein a second capacitor that is substantially identical in capacitance with the first capacitor is connected with a grounded line side of the at least one capacitive signal coupling unit.

10. A power line communication system according to claim 9, wherein the at least one capacitive signal coupling unit is equipped with an impedance matching circuit, the impedance matching circuit being separate from the leakage current reducing means.

11. A power line communication system according to claim 10,
    wherein the first capacitor is connected between one end of a primary coil of the impedance matching circuit and the at least one power line, wherein;
    the second capacitor is connected between another end of the primary coil of the impedance matching circuit and ground, and the at least one coaxial cable is connected with a secondary coil of the impedance matching circuit.

12. A capacitive signal coupling unit applied to a power line communication system and acting to signal-couple a coaxial cable and a power line, the coaxial cable performing transmission of signals, the power line communication system performing power line communications using carrier waves of high frequencies in the MHz range, the capacitive signal coupling unit comprising:
- a first capacitor mounted near the power line in the capacitive signal coupling unit; and
- a second capacitor which is substantially identical in capacitance with the first capacitor and which is connected to a grounded line side.

13. A capacitive signal coupling unit according to claim 12, further comprising an impedance matching circuit.

14. A capacitive signal coupling unit according to claim 13, wherein;
- the first capacitor is connected between one end of a primary coil of the impedance matching circuit and the power line,
- the second capacitor is connected between another end of the primary coil of the impedance matching circuit and ground, and
- the coaxial cable is connected with a secondary coil of the impedance matching circuit.

* * * * *